(12) United States Patent
Tanabe

(10) Patent No.: US 11,431,861 B2
(45) Date of Patent: Aug. 30, 2022

(54) INFORMATION PROCESSING SYSTEM AND NON-TRANSITORY COMPUTER READABLE MEDIUM STORING PROGRAM

(71) Applicant: FUJIFILM Business Innovation Corp., Tokyo (JP)

(72) Inventor: Shigeru Tanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 158 days.

(21) Appl. No.: 16/574,041

(22) Filed: Sep. 17, 2019

(65) Prior Publication Data

US 2020/0099803 A1 Mar. 26, 2020

(30) Foreign Application Priority Data

Sep. 25, 2018 (JP) .............................. JP2018-179558

(51) Int. Cl.
*H04N 1/00* (2006.01)
(52) U.S. Cl.
CPC ..... *H04N 1/00411* (2013.01); *H04N 1/00037* (2013.01); *H04N 1/00082* (2013.01); *H04N 1/00413* (2013.01)
(58) Field of Classification Search
None
See application file for complete search history.

(56) References Cited

U.S. PATENT DOCUMENTS

| 2007/0206211 | A1* | 9/2007 | Okutsu ................. G03G 15/50 |
| | | | 358/1.14 |
| 2016/0165072 | A1* | 6/2016 | Sato ................... H04N 1/00506 |
| | | | 358/1.15 |
| 2018/0063377 | A1* | 3/2018 | Tanabe ............... H04N 1/00413 |

FOREIGN PATENT DOCUMENTS

JP  2017202577  11/2017

OTHER PUBLICATIONS

"Office Action of Japan Counterpart Application" with English translation thereof, dated Jun. 21, 2022, p. 1-p. 5.

* cited by examiner

*Primary Examiner* — Frantz Bataille
(74) *Attorney, Agent, or Firm* — JCIPRNET

(57) ABSTRACT

An information processing system includes a selection application activation unit that activates a selection application, which is an application selected by an operator, among applications stored in an image processing apparatus, and a specific application activation unit that activates a specific application in a case where there is a change in a state of the image processing apparatus, and does not activate the specific application in a case where there is a change in a state where the selection application is activated.

17 Claims, 11 Drawing Sheets

FIG. 2

MANAGEMENT TABLE

| APPLICATION NAME | REGISTRATION INFORMATION | LICENSE | STATE |
|---|---|---|---|
| Copy | Native | ALWAYS READY FOR USE | DISPLAY |
| Scan | Native | ALWAYS READY FOR USE | DISPLAY RESERVATION |
| CS1 | Custom | ALWAYS READY FOR USE | NON-DISPLAY |
| CS2 | Custom | 20181231 | NON-DISPLAY |
| CS3 | Custom | 20151231 | NON-DISPLAY |

FIG. 3

| DETECTION | DETECTION METHOD | APPLICATION | THRESHOLD NUMBER OF TIMES |
|---|---|---|---|
| DADF SHEET DETECTION | Sensor | Scan | 3 |
| PLATEN SHEET DETECTION | Sensor | Copy | 2 |
| OPEN/CLOSE OF SHEET FEEDER | Sensor | Scan | 1 |
| LOGOUT | OUTPUT MONITORING | HomeMenu | NOT SET |
| RETURN FROM POWER SAVE | OUTPUT MONITORING | HomeMenu | NOT SET |
| AUTO RESET | OUTPUT MONITORING | Copy | 1 |

FIG. 9A

RESERVATION INFORMATION STORAGE TABLE

THERE IS NO DISPLAY RESERVATION APPLICATION

| DISPLAY RESERVATION APPLICATION | DETECTION EVENT | THRESHOLD NUMBER OF TIMES | COUNT VALUE |
|---|---|---|---|
| NONE | NONE | 0 | 0 |

FIG. 9B

RESERVATION INFORMATION STORAGE TABLE

THERE IS DISPLAY RESERVATION APPLICATION

| DISPLAY RESERVATION APPLICATION | DETECTION EVENT | THRESHOLD NUMBER OF TIMES | COUNT VALUE |
|---|---|---|---|
| Scan | DADF SHEET DETECTION | 3 | 2 |

DETECTION EVENT A: COPY  THRESHOLD NUMBER OF TIMES: 2

DETECTION EVENT B: COPY  THRESHOLD NUMBER OF TIMES: 2

↓ USER PERFORMS A  
  USER PERFORMS B  
  USER PERFORMS A  } 11C
  USER PERFORMS B

↓

Copy IS NOT DISPLAYED

↓ USER PERFORMS A

USER PERFORMS B

↓

Copy IS DISPLAYED

INFORMATION PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-179558 filed Sep. 25, 2018.

BACKGROUND

(i) Technical Field

The present invention relates to an information processing system and a non-transitory computer readable medium storing a program.

(ii) Related Art

JP2017-202577A discloses a process of displaying a screen of application software corresponding to a user specified by identification information received by an input unit in a case where a detection unit detects an event.

SUMMARY

In a case where a specific application is activated, or a predetermined screen is displayed in accordance with a change in the state of an image processing apparatus, an operator does not perform a dedicated operation for performing the activation or display, and the activation or display can be performed.

On the other hand, in a case where activation or display is performed uniformly according to a change in the state of the image processing apparatus, although the application is already activated, another application is activated or the screen which is already displayed may be switched to another screen, which may result in deterioration in operability of the operator.

Aspects of non-limiting embodiments of the present disclosure relate to an information processing system and a non-transitory computer readable medium storing a program, for suppressing deterioration in operability of an operator who performs an operation on an image processing apparatus, as compared with a case where a process corresponding to a change in the state is uniformly performed in a case where the state of the image processing apparatus changes.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a selection application activation unit that activates a selection application, which is an application selected by an operator, among applications stored in an image processing apparatus; and a specific application activation unit that activates a specific application in a case where there is a change in a state of the image processing apparatus, and does not activate the specific application in a case where there is a change in the state where the selection application is activated.

BRIEF DESCRIPTION OF THE DRAWINGS

Exemplary embodiment(s) of the present invention will be described in detail based on the following figures, wherein:

FIG. 2 is a diagram showing a management table;
FIG. 3 is a diagram showing information stored by a registration unit;
FIGS. 9A and 9B are diagrams showing a reservation information storage table.

DETAILED DESCRIPTION

Hereinafter, an exemplary embodiment of the present invention will be described in detail with reference to the accompanying drawings.

Figure 1:
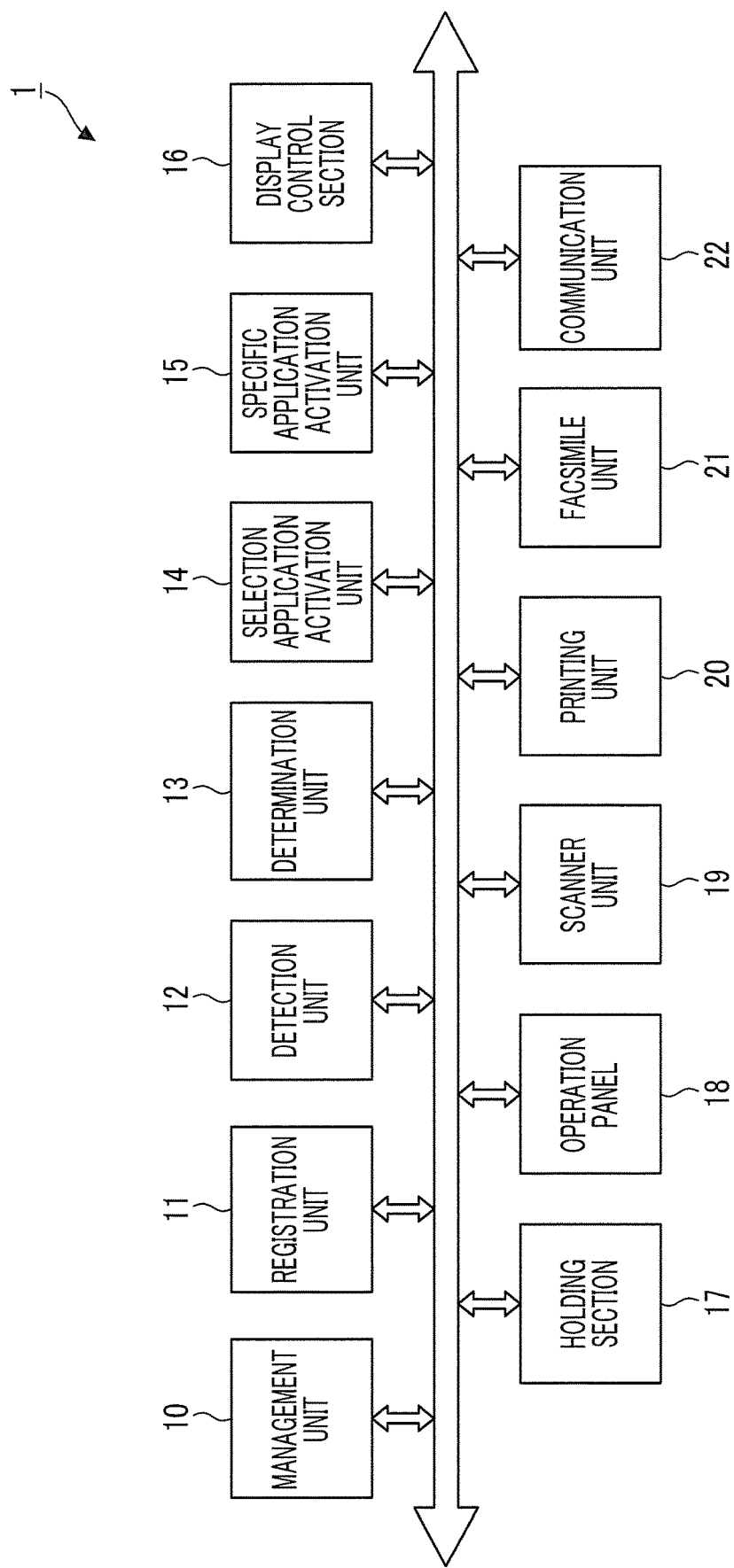
FIG. 1 is a diagram showing the overall configuration of an image processing apparatus.

FIG. 1 is a diagram showing the overall configuration of an image processing apparatus 1 of the present exemplary embodiment.

The image processing apparatus 1 is provided with a management unit 10, a registration unit 11, a detection unit 12, a determination unit 13, a selection application activation unit 14, a specific application activation unit 15, a display control section 16, a holding section 17, an operation panel 18, a scanner unit 19, a printing unit 20, a facsimile unit 21, and a communication unit 22. Although not shown, the image processing apparatus 1 includes a central processing unit (CPU), a read only memory (ROM), and a random access memory (RAM).

Here, the image processing apparatus 1 has an information processing system constituted by these functional units, and processes to be described later are executed by the information processing system.

The CPU reads a program stored in a ROM, a magnetic storage device or the like, and executes the program with the RAM as a work area. Thus, in the present exemplary embodiment, each functional unit such as the management unit 10, the registration unit 11, the detection unit 12, the determination unit 13, the selection application activation unit 14, the specific application activation unit 15, the display control section 16, and the holding section 17 is implemented.

Here, the program executed by the CPU may be provided to the image processing apparatus 1 by being stored in a computer-readable recording medium such as a magnetic recording medium (such as a magnetic tape and a magnetic disk), an optical recording medium (such as an optical disk), a magneto-optical recording medium, and a semiconductor memory. Further, the program executed by the CPU may be downloaded to the image processing apparatus 1 by using communication means such as the Internet.

The management unit 10 stores (holds) information on plural applications stored in the image processing apparatus 1.

Here, the application refers to an application program, and in the present exemplary embodiment, in a case where an application is executed, a function previously associated with the application is realized.

More specifically, the management unit 10 registers information such as the name, registration information, license information, and state of each application in the management table shown in FIG. 2 (a diagram showing the management table), and stores information on each application.

Here, the registration information is information indicating whether the application is registered from the factory shipment of the image processing apparatus 1, or whether the application is registered after the factory shipment. In FIG. 2, "Native" refers to an application registered from the factory shipment, and "Custom" refers to an application registered after the factory shipment.

The management unit 10 stores information indicating whether or not an application can be used, as license information. Specifically, as the license information, information indicating the expiration date of the application is stored.

In this example, for three applications "Copy", "Scan", and "CS1", the expiration date is not set, and the applications are always ready for use. For two applications "CS2" and "CS3", the expiration date is set, and the applications are ready for use until the expiration date.

Further, the management unit 10 stores information on the state (display, display reservation, non-display) of each application.

The registration unit 11 (see FIG. 1) is a functional unit that stores (holds) a detection event detected by the image processing apparatus 1 and an application activated in accordance with the detection event in association with each other.

In this example, as shown in FIG. 3 (a diagram showing information stored by the registration unit 11), the registration unit 11 stores the detection event "DADF sheet detection" and the application "Scan" in association with each other.

In the present exemplary embodiment, in a case where a detection event "DADF sheet detection" is detected, an application "Scan" is activated, and information on the application "Scan" is displayed on the operation panel 18 which is an example of a display unit.

Here, "DADF sheet detection" refers to an event in which a document placed on a document feeder (not shown) installed in the scanner unit 19 is detected.

Further, the registration unit 11 stores the detection event "platen sheet detection" and the application "Copy" in association with each other.

In the present exemplary embodiment, in a case where a detection event "platen sheet detection" is detected, an application "Copy" is activated, and information on the application "Copy" is displayed on the operation panel 18.

Here, "platen sheet detection" refers to an event in which a document placed on a document table (not shown) provided in the scanner unit 19 is detected.

Further, the registration unit 11 stores a detection event "open/close of the sheet feeder" and the application "Scan" in association with each other. In the present exemplary embodiment, in a case where a detection event "open/close of the sheet feeder" is detected, an application "Scan" is activated, and information on the application "Scan" is displayed on the operation panel 18.

Here, "open/close of the sheet feeder" refers to an event in which open/close of a sheet feeder (not shown) provided in the printing unit 20 is detected.

Further, the registration unit 11 stores a detection event "logout" and an application "HomeMenu" in association with each other. In the present exemplary embodiment, in a case where a detection event "logout" is detected, an application "HomeMenu" is activated, and information on the application "HomeMenu" is displayed on the operation panel 18 (a home screen is displayed).

Here, "logout" refers to an event in which the authentication state is canceled.

Further, the registration unit 11 stores a detection event "return from power save" and the application "HomeMenu" in association with each other. In the present exemplary embodiment, in a case where a detection event "return from power save" is detected, the application "HomeMenu" is activated, and information on the application "HomeMenu" is displayed on the operation panel 18.

Here, "return from power save" refers to an event in which the state is changed to a power supply state from a power supply stopped state.

Further, the registration unit 11 stores the detection event "auto reset" and the application "Copy" in association with each other. In the present exemplary embodiment, in a case where a detection event "auto reset" is detected, an application "Copy" is activated, and information on the application "Copy" is displayed on the operation panel 18.

Here, "auto reset" refers to an event in which the setting made at that time is canceled and transition is made to a preset initial state.

The registration unit 11 stores information on a detection method of a detection event.

Specifically, the registration unit 11 stores information "Sensor" or "output monitoring", as information on the detection method of the detection event.

Here, "Sensor" refers to detecting a detection event based on an output from a sensor (not shown) provided in the image processing apparatus 1.

"Output monitoring" refers to detecting a detection event based on an output from a functional unit that performs a detection event.

The registration unit 11 stores a threshold number of times in association with each detection event (each application).

In the present exemplary embodiment, in a case where the number of occurrences of the detection event reaches the threshold number of times, the application associated with the detection event is activated (details will be described later).

In the present exemplary embodiment, for example, the threshold number of times is set to 3 for a detection event "DADF sheet detection", and in a case where the detection event "DADF sheet detection" is detected three times, the application "Scan" is activated, and information on the application is displayed on the operation panel 18 (details will be described later).

Further, in a case where a detection event "platen sheet detection" is detected twice, an application "Copy" is activated and displayed.

For example, in a case where detection events of "open/close of the sheet feeder" or "auto reset" is detected once, an application "Scan" or "Copy" is activated and displayed.

The detection unit 12 (see FIG. 1) detects the above-described detection event occurring in the image processing apparatus 1.

Specifically, the detection unit 12 obtains an output from the sensor, or obtains an output from a functional unit that executes the logout and the like, and detects the above-described six detection events.

That is, the detection unit 12 detects six detection events of "DADF sheet detection", "platen sheet detection", "open/close of sheet feeder", "logout", "return from power save", and "auto reset".

The determination unit 13 determines (decides) which application is to be displayed on the operation panel 18.

In the present exemplary embodiment, the result of this determination is output to the specific application activation unit 15. In a case where the result of this determination is the determination result of activating the application, the specific application activation unit 15 activates the application (specific application) corresponding to the detection event. Thus, the application corresponding to the detection event is displayed on the operation panel 18.

The selection application activation unit 14 activates a selection application, which is an application selected by the operator, among plural applications stored in the image processing apparatus 1.

More specifically, in the present exemplary embodiment, the operator performs an operation on the operation panel 18 functioning as an operation receiving unit to select an application.

The selection application activation unit 14 activates the application selected by the operator. Thus, information on the application (selection application) selected by the operator is displayed on the operation panel 18.

The operation panel 18 is provided with a display device, a hardware key for returning to the home screen, a start button, and the like. The display device is a so-called touch panel.

The operation panel 18 functions as an operation receiving unit and receives an operation performed by the operator. The operation panel 18 also functions as a display unit, and displays information on the operator.

The scanner unit 19 has an image reading unit such as a CCD, and reads an image on a placed document.

The printing unit 20 forms an image on a sheet which is an example of a recording medium, by using an electrophotographic method, an inkjet head method, or the like.

The facsimile unit 21 transmits the image of the document read by the scanner unit 19 to the external device. The facsimile unit 21 receives the image information transmitted from the external device.

The communication unit 22 is a so-called communication device, and exchanges information with the external device.

Figure 4:
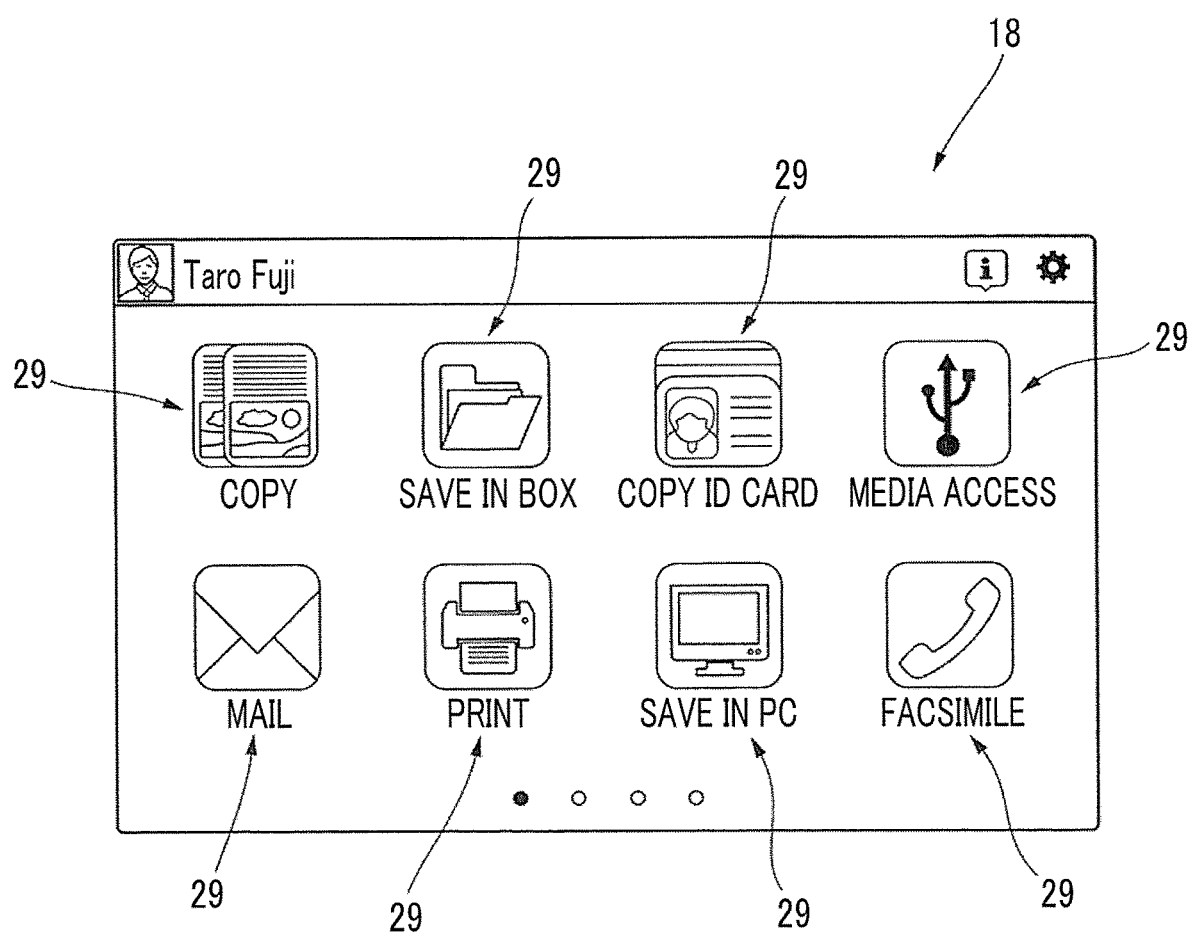
FIG. 4 is a diagram showing a home screen displayed on an operation panel.

FIG. 4 is a diagram showing a home screen displayed on the operation panel 18.

In the present exemplary embodiment, plural selection buttons (icons) 29 respectively representing applications are displayed on the home screen, and in a case where one of the selection buttons 29 is selected (pressed) by the operator, the selection application activation unit 14 activates an application (selection application) associated with the selected selection button 29.

Figure 5:
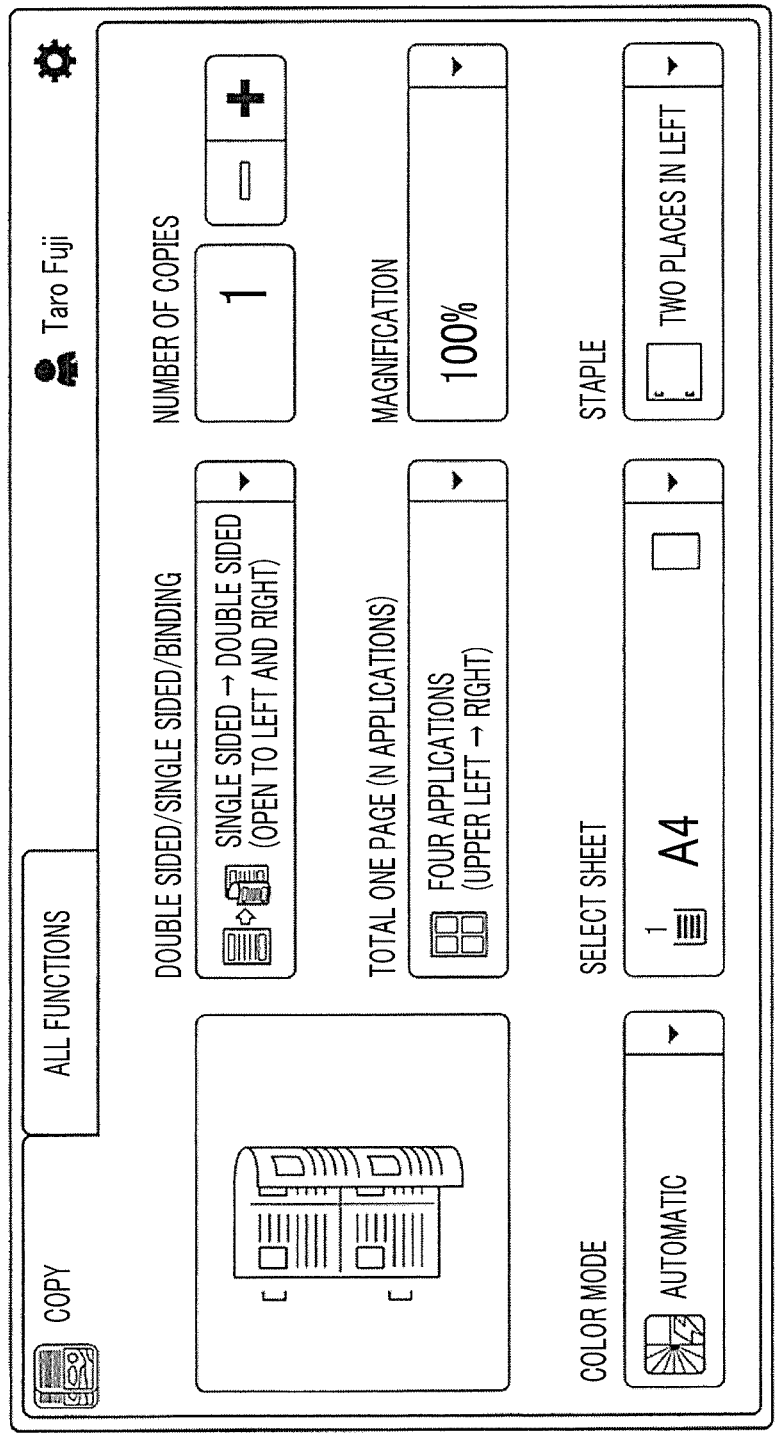
FIG. 5 is a diagram showing a display screen after application of "Copy" is activated.

FIG. 5 is a diagram showing a display screen after the application (selection application) "Copy" is activated.

In a case of performing copy, the operator performs an operation on the display screen shown in FIG. 5 and inputs a set value such as the number of copies. Then, in the present exemplary embodiment, in a case where the start button (not shown) is pressed (selected) by the operator, the process by the application "Copy" is started.

The specific application activation unit 15 activates the application determined (decided) (the application determined to be activated) by the determination unit 13.

In addition, in a case where a detection event occurs and there is a change in the state of the image processing apparatus 1, the specific application activation unit 15 activates a specific application (hereinafter referred to as "specific application") associated with the detection event.

As will be described later, in a case where there is a change in the state of the image processing apparatus 1 in a state where the above-described selection application is activated, the specific application activation unit 15 does not activate the specific application.

Alternatively, in a case where there is a change in the state of the image processing apparatus 1 in a state where the above-described selection application is activated, and a predetermined condition is further satisfied, the specific application activation unit 15 activates the specific application.

The display control section 16 (see FIG. 1) which is an example of a display control unit, a first screen display control unit, and a second screen display control unit performs display control of the display device provided on the operation panel 18.

Thus, the above-described selection application and the specific application is displayed on the display device.

Specifically, in response to the operation by the operator on the operation panel 18 provided in the image processing apparatus 1, the display control section 16 displays, on the operation panel 18, a corresponding screen corresponding to the operation.

More specifically, in a case where there is a selection operation of the selection application by the operator (in a case where the selection button 29 is selected), in response to the selection operation, the display control section 16 displays a corresponding screen according to the selection operation (corresponding screen corresponding to the selection application).

In a case where there is a change in the state of the image processing apparatus 1, the display control section 16 displays a predetermined screen on the operation panel 18. In other words, in a case where the detection event occurs, the display control section 16 displays a predetermined screen.

In addition, in the present exemplary embodiment, in a case where there is a change in the state of the image processing apparatus 1, a specific application is activated by the specific application activation unit 15, and at this time, the display control section 16 displays a predetermined screen for the specific application.

In a state where the corresponding screen (corresponding screen corresponding to the selection application) is displayed on the operation panel 18, in a case where there is a change in the state (in a case where the detection event occurs), the display control section 16 does not display the predetermined screen for the specific application.

Alternatively, in a state where the corresponding screen (corresponding screen corresponding to the selection application) is displayed on the operation panel 18, in a case where there is a change in the state and further the predetermined condition is satisfied, the display control section 16 displays the predetermined screen for the specific application.

The holding section 17 (see FIG. 1) as an example of the holding unit holds the setting information set by the operator in a state where the selection application is activated (for example, the setting information set by the operator in a state where the display screen shown in FIG. 5 is displayed), even after the specific application is activated.

In the present exemplary embodiment, the setting information held by the holding section 17 is reflected in the selection application, in a case where the specific application is closed, and the selection application is selected again.

Figure 6:
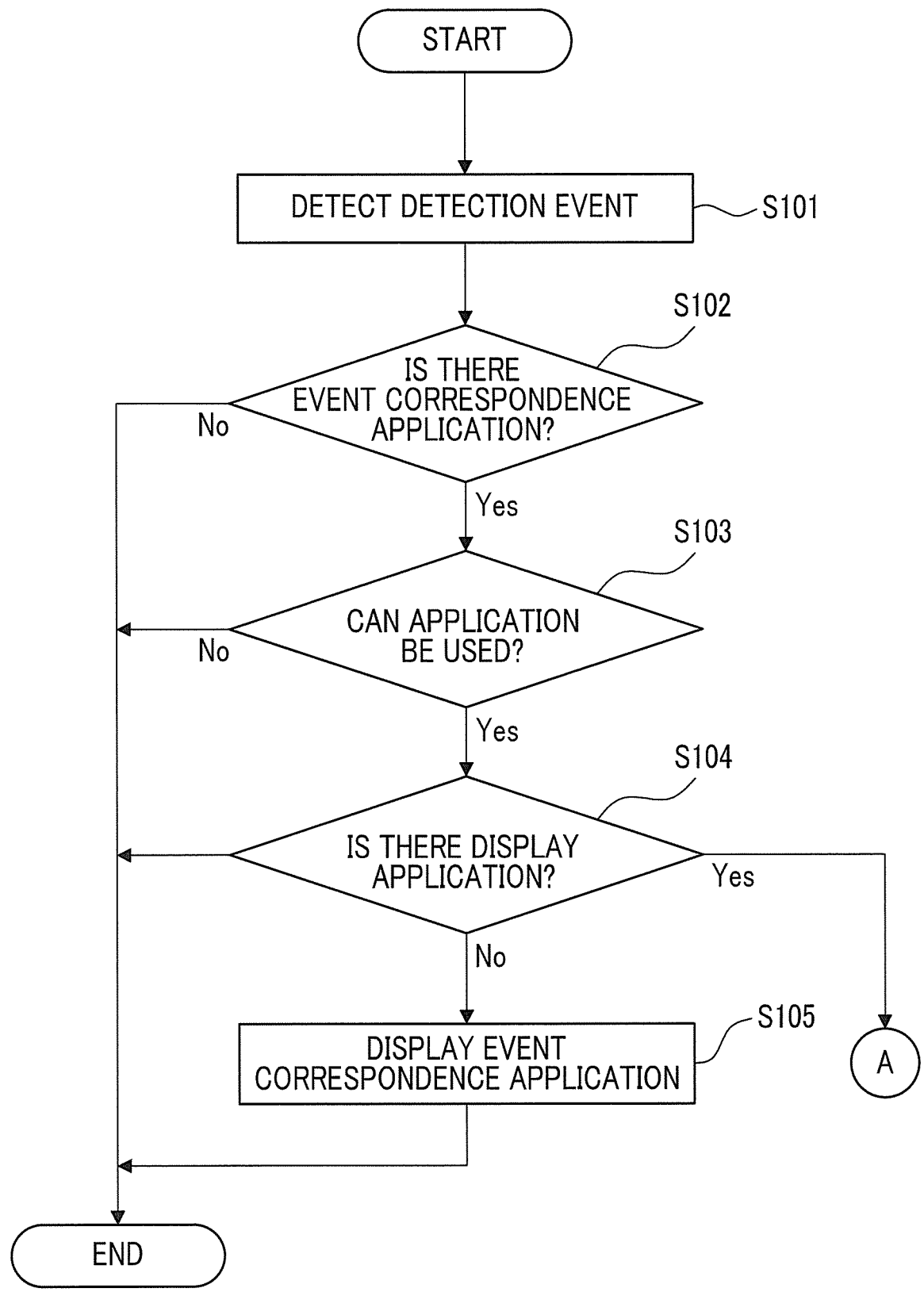
FIG. 6 is a diagram showing an example of a flow of a process executed by the image processing apparatus.
Figure 7:
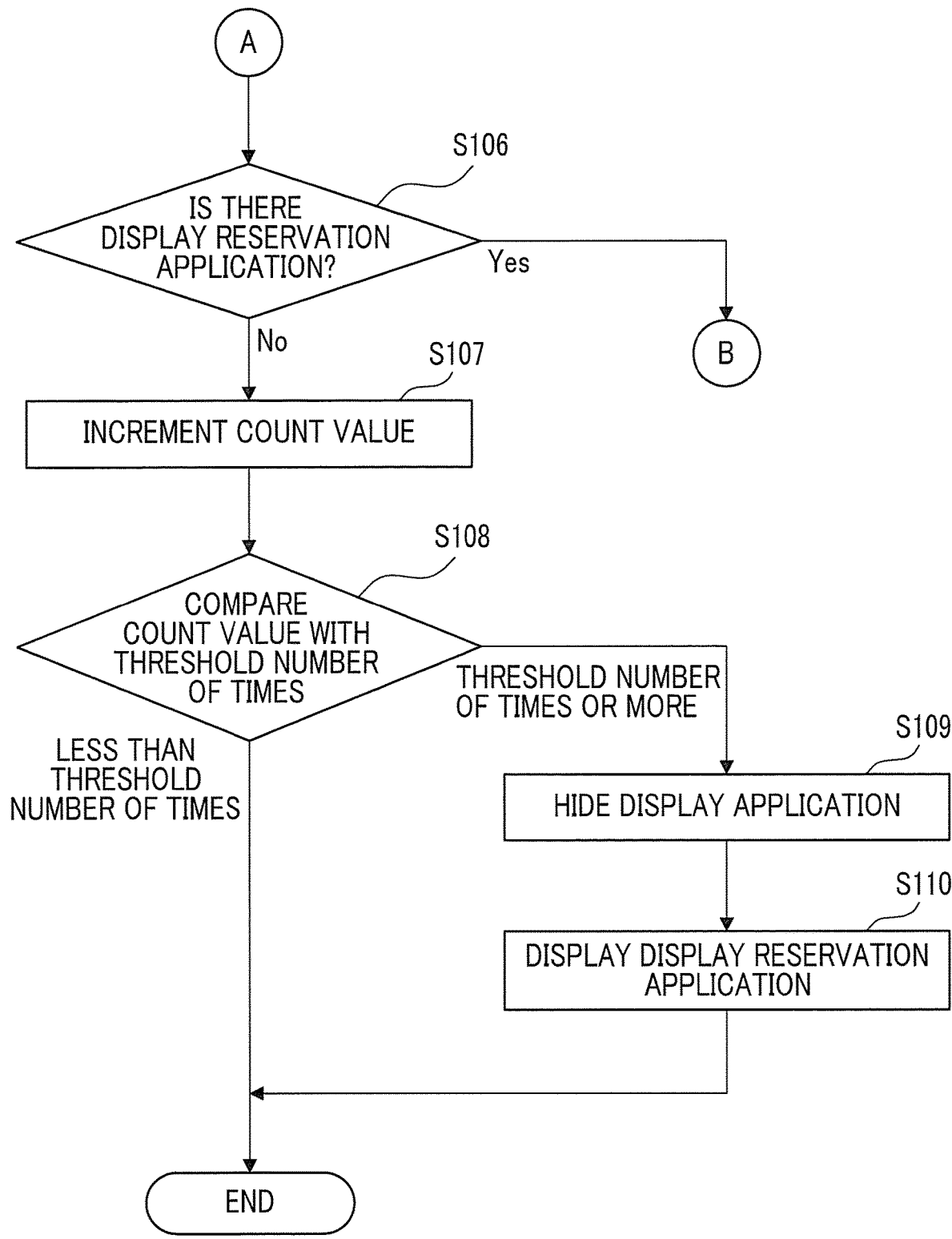
FIG. 7 is a diagram showing an example of the flow of the process executed by the image processing apparatus.
Figure 8:
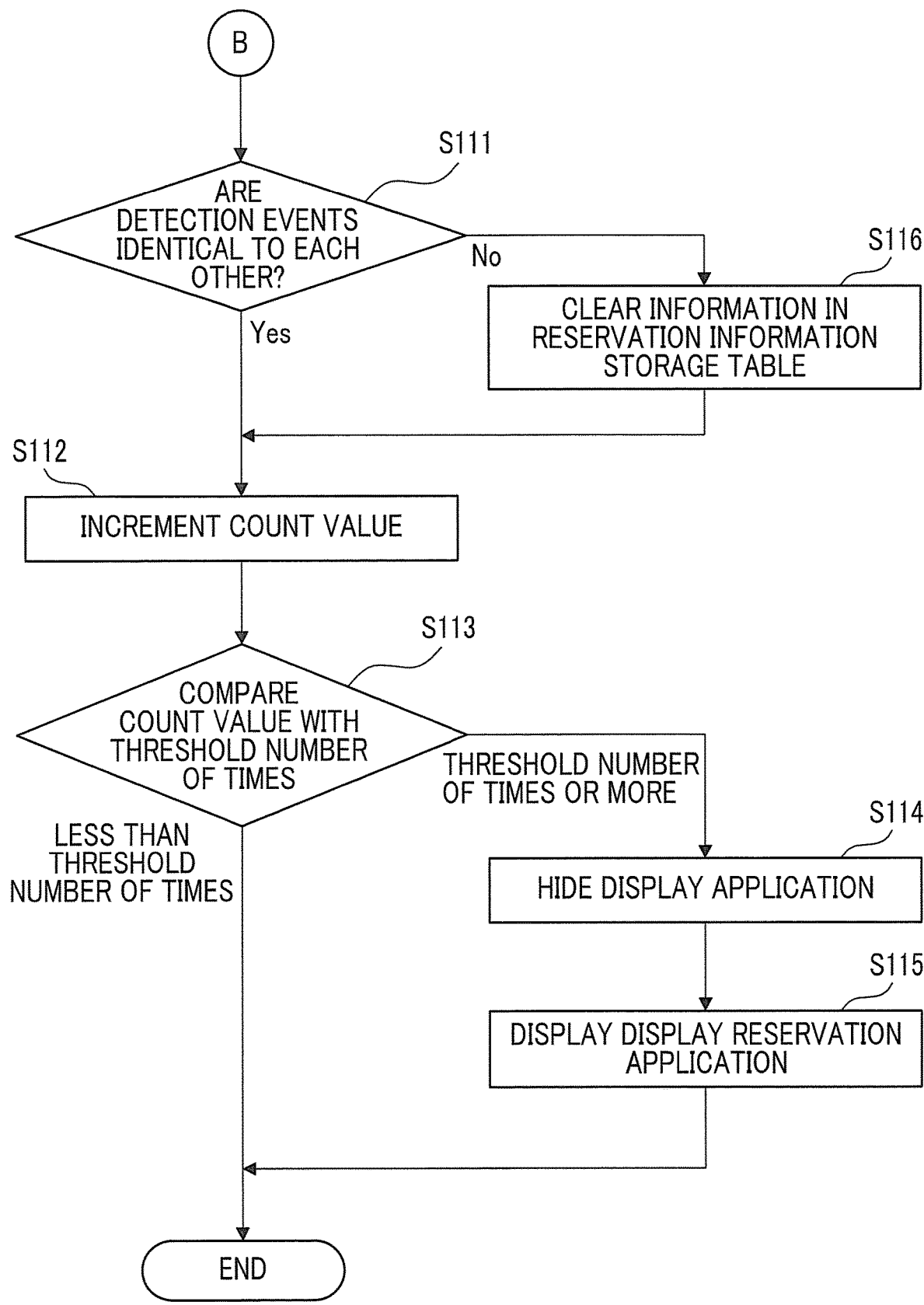
FIG. 8 is a diagram showing an example of the flow of the process executed by the image processing apparatus.

FIGS. 6 to 8 are diagrams showing examples of the flow of the process executed by the image processing apparatus 1.

In the present exemplary embodiment, in a case where a detection event occurs, the detection unit 12 detects the detection event (step S101).

Next, in the present exemplary embodiment, the registration unit 11 determines whether or not there is an application (hereinafter referred to as "event correspondence application") associated with the detection event (step S102).

In addition, the registration unit 11 refers to the table shown in FIG. 3 and determines whether there is an event correspondence application associated with the detection event.

Then, in a case where there is an event correspondence application, the management unit 10 refers to the license information of the event correspondence application and determines whether the event correspondence application can be used (step S103).

Then, in a case where it is determined in step S103 that the event correspondence application can be used, the presence or absence of the application is determined which has already been activated and displayed on the operation panel 18 (the selection application activated by the selection application activation unit 14) (hereinafter referred to as "display application) (step S104).

Then, in a case where it is determined that there is no display application, the specific application activation unit 15 activates the event correspondence application associated with the detection event. In other words, the specific application activation unit 15 activates the specific application associated with the detection event.

Thus, information on the event correspondence application is displayed on the operation panel 18 (step S105).

In the present exemplary embodiment, the presence or absence of a display application is determined in step S104, but an application for displaying the home screen or an application for displaying an initial setting screen (screen displayed when the power is turned on) is not included in the display application.

Therefore, for example, in a case where the home screen is displayed on the operation panel 18, it is determined in step S104 that there is no display application, and information on the event correspondence application is displayed, in step S105.

On the other hand, in a case where it is determined in step S104 that there is a display application, the process proceeds to step S106.

Specifically, for example, in a case where the selection application selected by the operator is displayed on the operation panel 18, the process proceeds to step S106.

In step S106, the determination unit 13 determines whether there is a display reservation application.

Here, the display reservation application is an application scheduled to be displayed next to the display application (selection application) displayed at the time.

In a case where it is determined in step S106 that there is no display reservation application, the determination unit 13 sets the event correspondence application as the display reservation application and increments (increases) the count value of the display reservation application (step S107).

Here, as shown in FIGS. 9A and 9B (diagrams showing a reservation information storage table), the determination unit 13 has a reservation information storage table, and determines whether there is a display reservation application with reference to the reservation information storage table, in step S106.

In a case where it is determined in step S106 that there is no display reservation application, the determination unit 13 registers the event correspondence application as a display reservation application, as shown in FIG. 9B.

In this example, the case where "Scan" is an event correspondence application is exemplified, and the determination unit 13 registers the application "Scan" as a display reservation application, as shown in FIG. 9B.

In this case, the management unit 10 also sets the state of the application "Scan" which is the event correspondence application as "display reservation" (see the management table in FIG. 2).

In the reservation information storage table shown in FIG. 9B, a count value can also be registered. In a case where the count value is incremented, the determination unit 13 registers the incremented count value in the reservation information storage table.

In a case of registering the event correspondence application as the display reservation application, the determination unit 13 acquires from the registration unit 11, the threshold number of times associated with the event correspondence application (acquires from the table shown in FIG. 3), and registers the threshold number of times in the reservation information storage table.

Note that FIG. 9A shows a case where there is no display reservation application, and in a case where there is no display reservation application, information on the display reservation application is not stored in the reservation information storage table.

In a case where a display reservation application occurs, information on the display reservation application may be displayed on the operation panel 18.

In addition, at the time when the display reservation application occurs, the specific application has not yet been activated, and the information on the selection application (display application) is still displayed on the display screen.

In this case, the display control section 16 may display the information on the event correspondence application in the reserved state (information on the display reservation application), on the display screen on which information on the selection application is displayed.

For example, information such as "application in the reserved state is displayed in a case where the currently displayed application is closed" may be displayed.

In other words, information on a specific application scheduled to be activated by the specific application activation unit 15 may be displayed.

Returning to FIG. 7, the flow of the process will be further described.

In step S108, the determination unit 13 compares the incremented count value with the threshold number of times.

Then, in a case where the count value is smaller than the threshold number of times, the process is ended as it is (the display reservation application is kept as it is).

On the other hand, in a case where the count value is equal to or larger than the threshold number of times, the determination unit 13 hides the display application (selection application) and decides to display the display reservation application (event correspondence application, specific application).

Then, in the present exemplary embodiment, the specific application activation unit 15 activates the display reservation application (specific application) accordingly.

The display control section 16 hides the display application (selection application) (step S109), and the display control section 16 displays the display reservation application activated by the specific application activation unit 15 (the event correspondence application and the specific application) (step S110).

The content of the decision made by the determination unit 13 (decision to hide the display application and to display the display reservation application) is output to the management unit 10.

In the present exemplary embodiment, in the information stored in the management table (see FIG. 2), the state of the application corresponding to the display application is set to "non-display", and the state of the application corresponding to the display reservation application is set to "display".

Here, in the present exemplary embodiment, in a case where the incremented count value reaches the threshold number of times, the event correspondence application (specific application) is activated and displayed.

In other words, in the present exemplary embodiment, in a case where a detection event occurs and the number of occurrences of the detection event reaches the threshold number of times, the event correspondence application is activated and displayed.

In addition, in the present exemplary embodiment, in a state where the selection application is activated, in a case where the detection event for which the threshold number of times is set to 2 or more has occurred only once, the specific application activation unit 15 does not activate the event correspondence application (specific application).

On the other hand, in a case where a predetermined operation is further performed by the operator (in a case where the detection event further occurs), from this state (from the state after the detection event has occurred once), the specific application activation unit 15 activates a specific application.

In addition, in the present exemplary embodiment, in a case where there is a first state change in a state where the selection application is activated, and thereafter, the state is further changed, the specific application activation unit 15 activates a specific application for which the threshold number of times is set to 2 or more.

With respect to a specific application for which the threshold number of times is set to 3 or more, in a case where there is a first state change in a state where the selection application is activated, and thereafter, the state is further changed predetermined plural number of times, the specific application activation unit 15 activates the specific application.

To explain further, in the present exemplary embodiment, in a state where a corresponding screen corresponding to the operation of the operator (corresponding screen corresponding to the selection application displayed by selecting the selection application) is displayed on the operation panel 18, in a case where there is a change in the state, the specific application is activated, and the display of the specific application is performed.

In a case where a specific application (event correspondence application corresponding to the detection event) is activated, the display screen on the operation panel 18 is switched. In this case, for example, it is preferable that the display control section 16 performs display relating to the selection application, on the switched display screen.

In other words, for example, it is preferable that the display control section 16 performs display relating to the application that has been displayed before switching of the display screen, on the switched display screen.

More specifically, in the present exemplary embodiment, in a case where the specific application is activated in a state where the selection application is activated, the display screen is switched from a first display screen displayed for the selection application to a second display screen displayed for the specific application.

In this case, for example, it is preferable that the display relating to the selection application originally displayed is performed on a part of the second display screen.

More specifically, on a part of the second display screen, for example, it is preferable to perform a display for receiving an operation to return to the first display screen (an operation to return to the display for the selection application), as a display relating to the selection application.

More specifically, for example, a selection button for returning to the first display screen is displayed on a part of the second display screen. In addition, for example, an operation to return to the first display screen may be guided, such as "You can return to the selection application. Please press a button to return".

On the other hand, in a case where it is determined in step S106 that there is already a display reservation application, the process proceeds to step S111.

In step S111, the determination unit 13 determines whether or not the detection event associated with the already existing display reservation application and the detection event associated with the event correspondence application (application associated with a newly occurring detection event) are identical to each other.

In a case where it is determined that the detection events are identical to each other, the determination unit 13 increments the count value of the display reservation application registered at that time in the reservation information storage table (see FIGS. 9A and 9B) (step S112).

Thereafter, similarly to the above, the determination unit 13 compares the count value of the display reservation application (the incremented count value) with the threshold number of times (step S113).

In a case where the count value is smaller than the threshold number of times, the process is ended as it is.

On the other hand, in a case where the count value is equal to or larger than the threshold number of times, similarly to the above, the determination unit 13 makes a decision to hide the display application and to display the display reservation application.

Then, in this case, similarly to the above, the display control section 16 hides the display application (step S114), and performs a process of displaying the display reservation application (step S115).

In a case where the determination unit 13 determines in step S111 that the detection event associated with the already existing display reservation application and the detection event associated with the event correspondence application (application associated with a newly occurring detection event) are not identical to each other, the information stored in the reservation information storage table is temporarily cleared (step S116). In other words, the display reservation for the display reservation application is canceled.

Then, the determination unit 13 registers the event correspondence application (application associated with a newly occurring detection event) in the reservation information storage table, as a new display reservation application. At this time, the determination unit 13 increments the count value for the new display reservation application (step S112), and sets the count value to 1.

Thereafter, the process from step S113 onward is performed. Here, the process from step S113 onward is identical to the above, and the explanation is omitted here.

As another process, in a case where the type of the display application (selection application) and the type of the event correspondence application (the specific application to be activated from now) are identical to each other, the event correspondence application (specific application) may not be activated.

In other words, only in a case where the type of the display application and the type of the event correspondence application are different, the event correspondence application may be activated.

Specifically, in the state where the selection application is activated, in a case where there is a change in a state (a detection event occurs), and furthermore, the type of the selection application and the type of the specific application to be activated in response to the detection event are different, the specific application is activated. On the other hand, in a case where the types are identical to each other, the specific application may not be activated.

In a case where such a process is performed, information indicating the type of the application is previously attached to each of the selection application activated by the selection application activation unit 14 and the specific application (event correspondence application) activated by the specific application activation unit 15.

Determination as to whether or not the type is identical is performed based on information on the type attached to each application.

Here, types of applications are copy, scan, facsimile, or the like, and each type may have plural applications.

Examples of the type of scan include not only an application (scan application) that performs normal scan but also an application that performs a transmission process after scan (post-scan transmission application).

In this case, in a state where the scan application is displayed as a selection application, even in a case where the post-scan transmission application is not activated (even in a case where activation corresponding to the detection event is not performed), by further performing operations on the scan application, the process similar to the post-scan transmission application is likely to be performed.

Therefore, as described above, in a case where the type of the selection application and the type of the specific application are identical to each other, the specific application may not be activated.

On the other hand, even in a state where the types are identical, in a case where the specific application to be activated from now is a specific application for which some settings for the selection application that has been displayed so far has already been made, the specific application may be activated.

For example, in a case where the selection application (display application) is a "Copy" application, and the specific application (event correspondence application) is an application for which some settings for a printing mode has already been made, such as "2 UP copy" application, the application may be activated.

In this case, for example, in a case where the "Copy" application is closed and the application "2 UP copy" is activated, the setting of 2 UP has already been made, and the operator is less troubled with setting input.

"2 UP copy" refers to a printing mode in which images of plural pages are formed on one sheet of paper.

Even in a case where the types are identical, in a case where the use application of the selection application differs from the use application of the specific application such that the setting that cannot be set in the selection application can be set in the specific application, the specific application may be activated.

For example, in a case where the selection application (display application) is "Scan to SMB" application in which a scanned file is stored into a folder on a user's PC using the SMB protocol, and the specific application (event correspondence application) is "Scan to mail" application in which a scanned file is sent to a mail address as a destination by using a mail, the specific application may be activated.

In this case, in a case where "Scan to SMB" application is closed and "Scan to mail" application is activated, for example, the user scans the document and stores the scanned document in a folder in his own PC which is on the identical subnet to the MFP, and in a case of performing transmission to a destination (for example, a mail server outside a firewall), which cannot be performed by a selection application, such as scanning the identical document and sending the scanned document to a mail address of a customer, "Scan to mail" application is automatically activated.

Different usage used herein refers to that there is a difference between processes that can be executed by applications, and for example, applications with different usages refer to that protocols to be used are different, there is a difference in settings that can be set in applications, and the user has designated in advance that the applications have different usages.

Here, in the present exemplary embodiment, according to the detection event, an application associated with the detection event is activated, and information on the application is displayed on the operation panel 18.

In this case, the operator is no longer required to perform an operation (such as an operation of selecting an application) on the operation panel 18, and a process by the application can be performed with a simple procedure.

On the other hand, depending on the operator, it is also assumed that a selection operation on the operation panel 18 is performed first and then an operation corresponding to a detection event is performed.

In this case, the settings made in the application (selection application) activated by performing the selection operation are reset, or the display of the application activated by performing the selection operation is switched to another display.

On the other hand, in the present exemplary embodiment, even in a case where a detection event is detected for an application of which threshold numbers of times has plural values, the application is not activated immediately but is reserved (set as a display reserved state).

Therefore, in the present exemplary embodiment, resetting the setting or switching the display screen to another display screen hardly occurs.

On the other hand, depending on the operator, there are also cases where it is desired to activate an application that uses a detection event.

In this case, in the present exemplary embodiment, as described above, in a state where the display application is displayed, in a case where the operator performs the operation corresponding to the detection event plural times, the event correspondence application (specific application) is activated. In this case, the operator can activate the application without performing the selection operation on the operation panel 18.

As will be described later, in the present exemplary embodiment, in a case where the operator performs an operation of leaving the display application, such as closing the display application, the display application (selection application) is hidden.

In the present exemplary embodiment, in this case, the display reservation application (the event correspondence application, the specific application) is activated.

Here, the operation of leaving the display application refers to an operation involving switching from a display screen displaying information on the display application to another display screen.

Examples of the operation of leaving the display application include an operation of closing the display application or an operation of reducing and displaying the display application.

Examples of the operation of leaving the display application also include an operation for starting execution of a display application such as depression of a start button or an operation for returning to the home screen.

In the present exemplary embodiment, a case where the event correspondence application is set to a display reserved state in a case where a detection event is detected (in a case where a detection event in which the threshold number of times is set with plural values is detected) in a state where there is the display application will be described as an example.

Incidentally, the present invention is not limited to this, instead of setting the display reserved state, in the case where the display application is already present, the process of not activating the event correspondence application may be performed.

In this case, it becomes impossible to respond to the request of the operator who wants to activate the application using the detection event. As described above, in the case of setting the display reserved state, it is possible to respond to this demand.

Figure 10:
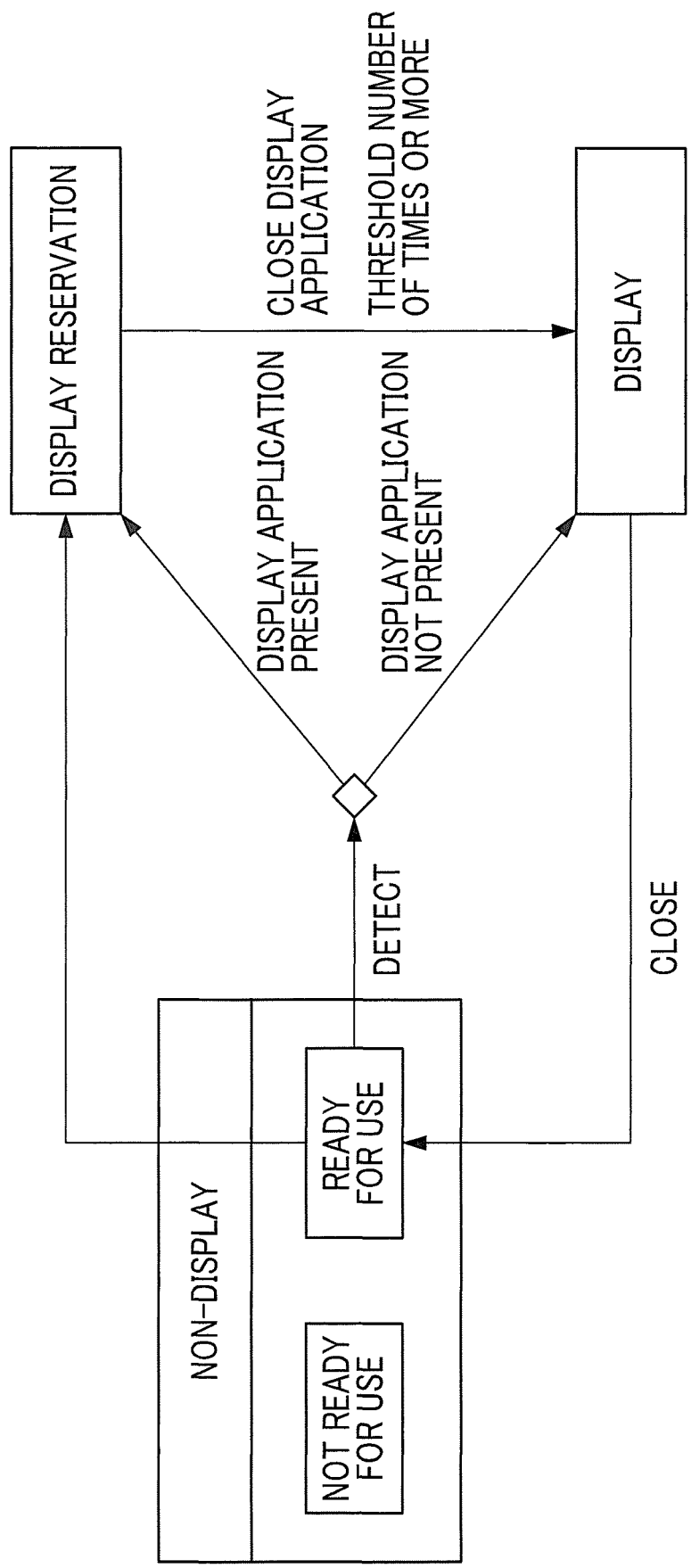
FIG. 10 is a diagram for explaining a state of an application.

FIG. 10 is a diagram for explaining the state of the application.

In the present exemplary embodiment, the application is set to one of three states: non-display, display, and display reservation. In addition, in the present exemplary embodiment, the application whose license is valid and usable is set to one of three states of "non-display", "display", and "display reservation".

Here, the "non-display" state refers to a state in which an application is not displayed on the operation panel 18.

In the present exemplary embodiment, with respect to a hidden application, a detection event associated with this application is detected, and in a case where the number of occurrences of the detection event reaches the threshold number of times or more, the application is activated and is displayed on the operation panel 18.

In addition, in the present exemplary embodiment, in a case where a detection event is detected, and a display application does not exist, an application corresponding to the detection event is displayed.

On the other hand, in a case where there is a display application, in a case where the number of occurrences of the detection event is less than the threshold number of times, the application corresponding to the detection event is set to the display reserved state, and in a case where the number of occurrences of the detection event is not less than the threshold number of times, the application corresponding to the detection event is set to a display state.

The "display" state refers to a state where the application is activated and information on the application is displayed on the operation panel 18.

Here, in the present exemplary embodiment, in the case where there is an instruction from the operator to leave the display application, such as closing the display application in the display state, and there is an application in the display reserved state, the application in the display reserved state is activated, and is set to the display state.

In the present exemplary embodiment, the case where the application in the display reserved state is activated after there is an instruction from the operator to leave the display application is explained as an example, the form of the process is not limited to this.

For example, in the case where the application in the display reserved state is activated before there is an instruction from the operator to leave the display application, and then there is an instruction from the operator to leave, the activated application may be displayed.

In the present exemplary embodiment, in the case where there is an instruction from the operator to leave the display application, and there is no application in the display reserved state at this time, the home screen is displayed (a screen set as the initial setting screen is displayed).

In the present exemplary embodiment, in the case where there is an instruction from the operator to leave the display application, and there is an application in the display reserved state at this time, the application in the display reserved state is displayed.

More specifically, in the present exemplary embodiment, on the operation panel 18, a hardware key for returning to the home screen is provided or a display button for closing the display is displayed on the display screen on which the display application is displayed.

In the present exemplary embodiment, in the case where the hardware key or the display button is pressed (selected) and there is no application in the display reserved state at this time, the home screen is displayed.

In the present exemplary embodiment, in the case where the hardware key or the display button is pressed (selected) and there is an application in the display reserved state at this time, the application in the display reserved state is displayed.

In other words, in the present exemplary embodiment, in the case where there is an instruction from the operator to leave the display application, the home screen is displayed or the application in the display reserved state is displayed.

Here, in the case where there is an instruction from the operator to leave the displayed application, it is assumed that the operator wishes to activate another application.

In this case, in a case where the application in the display reserved state is activated in accordance with the instruction to leave, the operator can save the trouble of separately selecting and activating the application.

In a state where the display application is displayed, in a case where a button for returning to the home screen is pressed as an instruction to leave (in a case where a predetermined operation for returning to the home screen is performed), a process of displaying the home screen may be performed instead of activating the application in the reserved state.

In this case, this reserved state of the application that has been in the display reserved state is canceled.

In a case of selecting the button for returning to the home screen instead of an operation of closing the display application, there is a high possibility that the user wants to close the display application and display the home screen.

Thus, when the operator presses a button for which an application (screen) to be displayed is predetermined, such as the button for returning to the home screen, instead of the operation of closing the display application, for example, it is preferable to display a screen corresponding to the button, instead of the application in the display reserved state.

The "display reserved" state refers to a state where the target application is scheduled to be displayed next to the display application.

In the present exemplary embodiment, in a case where there is a display application in a case of trying to display the event correspondence application (in a case of trying to activate the specific application), as described above, the event correspondence application is an application in a display reserved state.

In the present exemplary embodiment, in a case where there is an application in the display reserved state, and there is also a display application at the same time and the display application is closed, the display reservation application is activated and displayed.

In the present exemplary embodiment, as described above, in a case where a new event correspondence application is registered as an application for display reservation, there may already be a display reservation application.

In this case, in a case where the already existing display reservation application and the new event correspondence application are identical to each other, the counter is incremented, and according to the incremented count value, the display reserved state is maintained or the display reservation application (=event correspondence application) is activated and displayed.

In a case where the display reservation application and the event correspondence application are different from each other, the display reserved state of the display reservation application is canceled, and the event correspondence application is registered as a new display reservation application.

In the above description, as shown in step S111 (see FIG. 8), the detection event associated with the display reservation application and the detection event associated with the event correspondence application are compared. In a case where the compared detection events are identical to each other, the count value of the display reservation application is incremented.

Incidentally, the present invention is not limited to this, and the count value may be incremented for each application, and the event correspondence application may be displayed or hidden depending on whether or not the count value exceeds the threshold number of times.

Figure 11A:
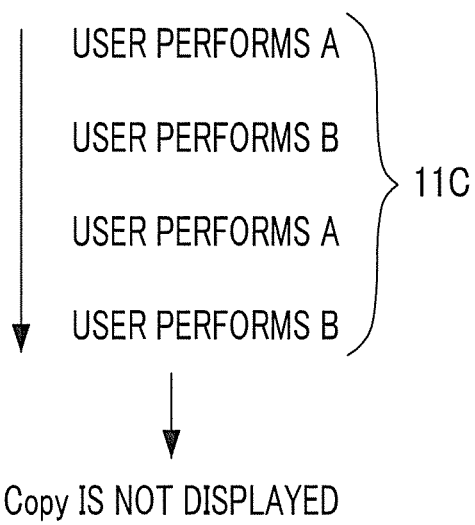
FIGS. 11A and 11B are diagrams for explaining another example of a processing form.

Here, for example, as shown in FIG. 11A (a diagram explaining another example of the processing form), the case is considered where the application "Copy" is associated with the detection event A and the application "Copy" is associated with the detection event B, and the count value is incremented for each detection event.

In this case, as shown by reference numeral 11C in FIG. 11A, despite the operator performing each of the two detection events (the detection event A and the detection event B) plural times, the count value does not reach the threshold number of times (=2) and the display is not switched (event correspondence application is not activated).

Figure 11B:
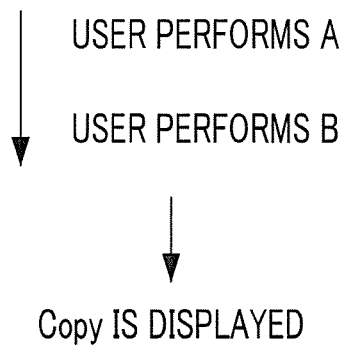

On the other hand, in a case where the count value is incremented for each application, as shown in FIG. 11B, for example, in a case where the second detection event B is detected, the display is switched (event correspondence application is activated).

Although the explanation is omitted in the above description, in the present exemplary embodiment, in a state where the display application is displayed, in a case where the operator performs an operation related to this display application, the display reserved state present at that time may be canceled (status of the display reserved state of the application in the display reserved state may be canceled).

Specifically, for example, in a state where the display application is displayed, in a case where the operator performs an operation on the operation panel 18 to change the setting value on the display application or input the setting value, and for example, the operator gives an instruction to start executing the display application, the display reserved state present at that time may be canceled.

Here, for example, a case is assumed where a detection event is detected in a state where the display application is displayed, and the event correspondence application corresponding to the detection event is in the display reserved state.

In this case, in a case where the operator performs an operation related to the display application, specifically, in a case where an operation other than the operation of closing the display application, such as an operation of changing the setting value described above, is performed, it is considered that the operator desires a process by the display application.

In this case, as described above, the display reservation is canceled. Thus, in this case, in a case where the process of the display application is ended, the display reservation application is not activated, and the screen returns to the home screen.

Here, a mode is considered in which the display reservation application is activated after the process of the display application is ended, but in this case, on the contrary, there is a high possibility that the process not desired by the operator is executed (there is a high possibility that a display not desired by the operator is made).

Therefore, as described above, in a case where an operation is performed on the display application, the display reservation at that time may be canceled.

The cancellation of the display reservation is not limited to the case where there is an operation on the display application, but a dedicated operation for canceling the display reservation is prepared in advance, and in a case where there is the operation, the display reservation may be cancelled.

Others

As types of applications, there are an application of an immediate execution type (hereinafter referred to as "immediate application") and an application of a confirmation type (hereinafter referred to as "confirmation application").

The immediate application is an application that is processed until the end, in a case where the application is activated, even in a case where there is no additional input operation by the operator.

The confirmation application is the applications described above. In a case where the confirmation application is activated, the display on the operation panel 18 is temporarily performed, and then process is started in a case where there is further an instruction from the operator.

In the present exemplary embodiment, the immediate application can also be set to the display reserved state. In this case, in a case where the operator performs the leaving operation, the immediate application is activated and executed.

Here, in the case where the immediate application is activated in accordance with the leaving operation, the processing content of the immediate application is displayed once, and in the case where there is an instruction from the operator, it is preferable to start the process by the immediate application, for example.

In other words, the immediate application is an application that can be executed even though there is no separate instruction from the operator in a case where there is a leaving operation, but in the case where the immediate application is activated from the display reserved state, as described above, the processing content is displayed once, and in the case where there is an instruction from the operator, it is preferable to start the process, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a processor configured to function as:
a selection application activation unit that activates a selection application, which is an application selected by an operator, among applications stored in an image processing apparatus, wherein when the selection application is activated, information regarding the selection application is configured to be displayed on a display; and
a specific application activation unit that configured to activate a specific application in a case where there is a change in a state of the image processing apparatus, and configured to not activate the specific application in a case where there is a change in the state while the selection application is activated,
wherein when the specific application is activated, information regarding the specific application is configured to be displayed on the display,
wherein the specific application is different from the selection application.

2. The information processing system according to claim 1,
wherein, in a case where the specific application is not activated, and a predetermined condition is satisfied, the specific application activation unit activates the specific application.

3. The information processing system according to claim 2,
wherein in a case where there is a change in a state where the selection application is activated, and there is a predetermined operation by the operator, the specific application activation unit activates the specific application.

4. The information processing system according to claim 2,
wherein in a case where there is a change in a state where the selection application is activated, and thereafter, there is a further change in the state where the selection application is activated, the specific application activation unit activates the specific application.

5. The information processing system according to claim 2,
wherein in a case where there is a change in a state where the selection application is activated, and thereafter, there is a further change in the state where the selection application is activated a plurality of predetermined times, the specific application activation unit activates the specific application.

6. The information processing system according to claim 2, the processor further comprising:
a display control unit that in a case where the predetermined condition is satisfied in a state where the selection application is activated, and the specific application is activated, and a display screen is switched from a first display screen displayed for the selection application to a second display screen displayed for the specific application, performs a display relating to the selection application on a part of the second display screen.

7. The information processing system according to claim 6,
wherein the display control unit performs a display for receiving an operation of returning to the first display screen as a display relating to the selection application.

8. The information processing system according to claim 2, further comprising:
a holding unit, comprising a memory, that holds setting information set by the operator in a state where the selection application is activated even after the specific application is activated.

9. The information processing system according to claim 8,
wherein, in a case where the selection application is selected again after the specific application is activated, the setting information held by the holding unit is reflected in the selection application.

10. The information processing system according to claim 2,
wherein in a case where there is a change in a state where the selection application is activated, and there is an instruction to leave the selection application from the operator, the specific application activation unit activates the specific application.

11. The information processing system according to claim 2,
wherein each of the selection application to be activated by the selection application activation unit and the specific application to be activated by the specific application activation unit is attached with information indicating a type of the application, and
wherein in a case where there is a change in a state where the selection application is activated, the predetermined condition is satisfied, and the type of the selection application and the type of the specific application are different from each other, the specific application activation unit activates the specific application.

12. The information processing system according to claim 1, further comprising:
a display control unit that displays information on the specific application to be activated by the specific application activation unit, on a display screen in a case where the selection application is activated.

13. An information processing system comprising:
a processor configured to function as:
a first screen display control unit that, in response to an operation by an operator on an operation receiving unit provided in an image processing apparatus, displays a corresponding screen corresponding to the operation on a display unit of the image processing apparatus; and a second screen display control unit that in a case where there is a change in a state of the image processing apparatus, displays a predetermined screen on the display unit, and in a case where there is a change in a state while the corresponding screen is displayed on the display unit, does not display the predetermined screen, wherein the predetermined screen is different from the corresponding screen.

14. The information processing system according to claim 13, wherein, in a case where the predetermined screen is not displayed, and a predetermined condition is satisfied, the second screen display control unit displays the predetermined screen.

15. The information processing system according to claim 14, wherein in a case where there is a change in a state where the corresponding screen is displayed on the display unit, and the operator performs an operation of closing the corresponding screen, the second screen display control unit displays the predetermined screen.

16. The information processing system according to claim 14, wherein in a case where there is a change in a state .where the corresponding screen is displayed on the display unit by the operator performing an operation in the state, and the operator performs the operation, the second screen display control unit displays the predetermined screen.

17. A non-transitory computer readable medium storing a program causing a computer to implement:

a selection application activation function of activating a selection application, which is an application selected by an operator, among applications stored in an image processing apparatus, wherein when the selection application is activated, information regarding the selection application is configured to be displayed on a display; and a specific application activation function of activating a specific application in a case where there is a change in a state of the image processing apparatus, and not activating the specific application in a case where there is a change in a state while the selection application is activated, wherein when the specific application is activated, information regarding the specific application is configured to be displayed on the display, wherein the specific application is different from the selection application.

* * * * *